May 8, 1928.
J. E. BODA
POWER LIFT PLOW
Filed April 6, 1921
1,669,037
6 Sheets-Sheet 1
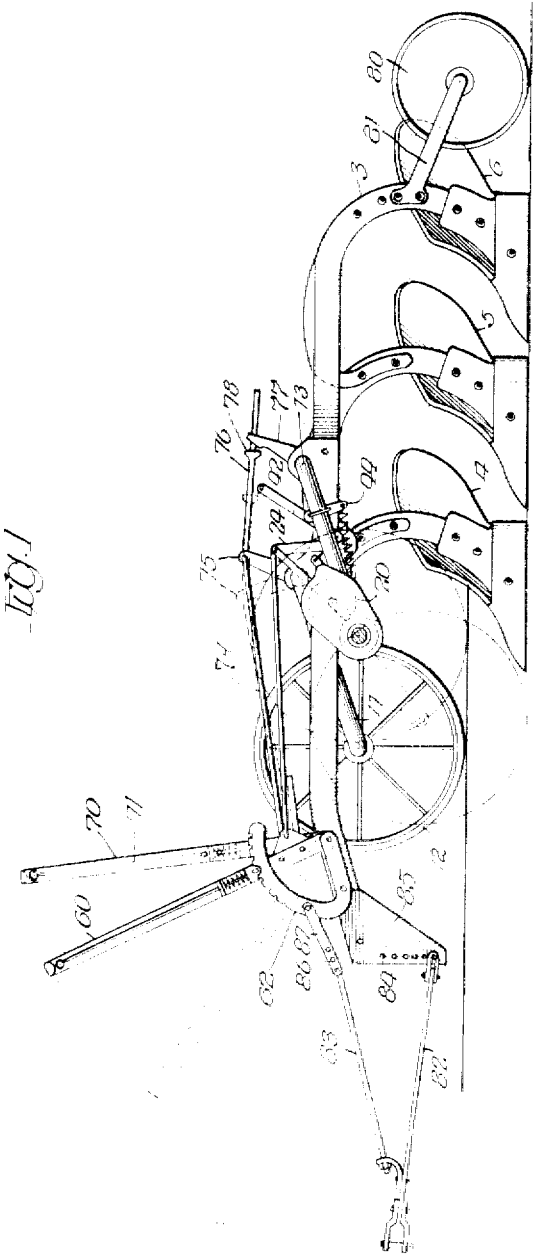
Inventor
Joseph E. Boda
By L. C. Shonts
Atty

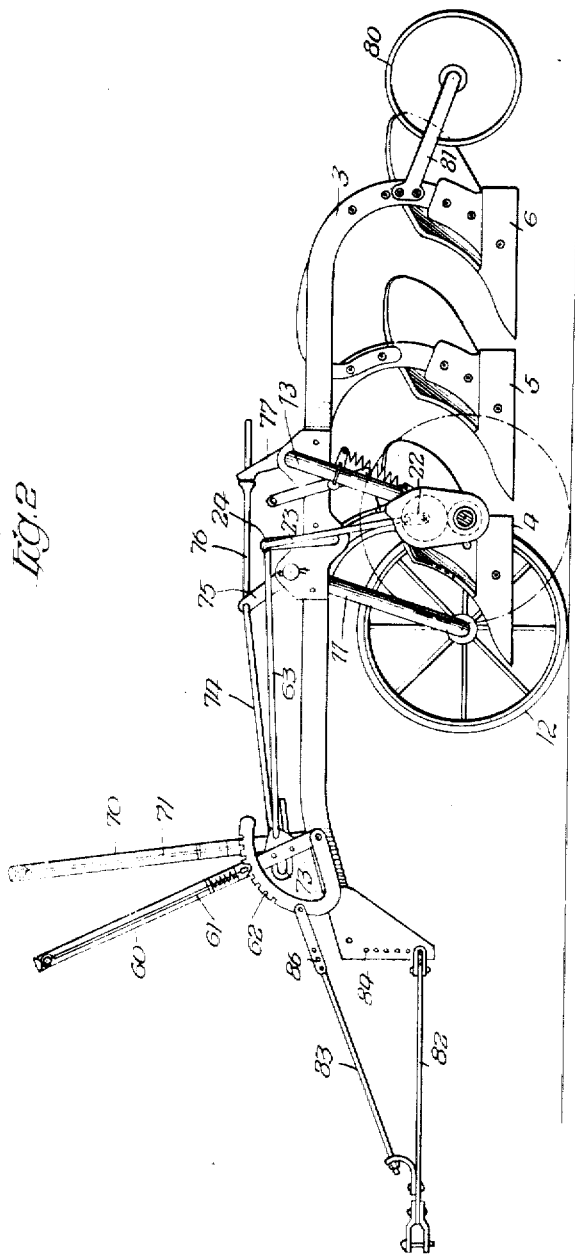

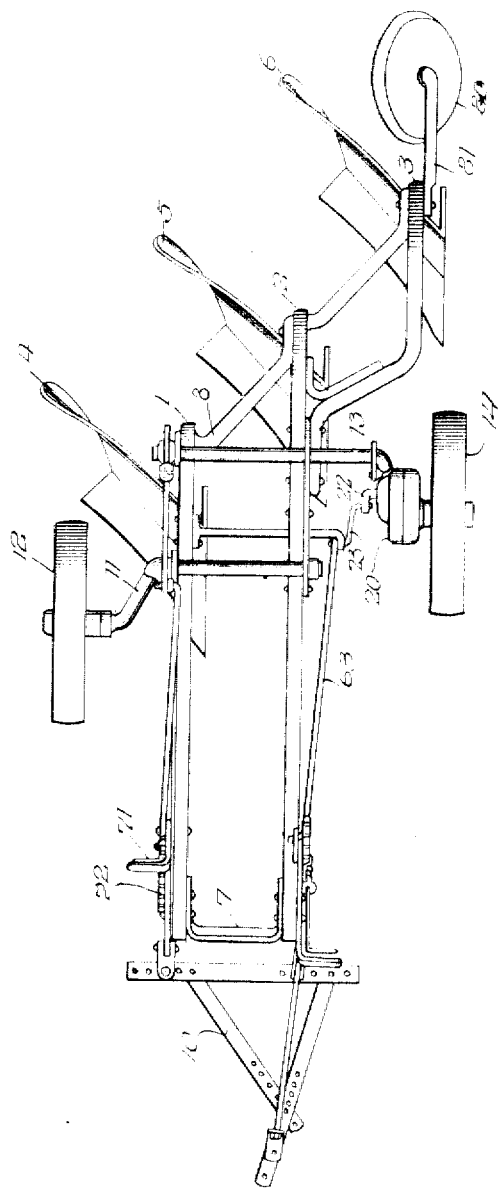

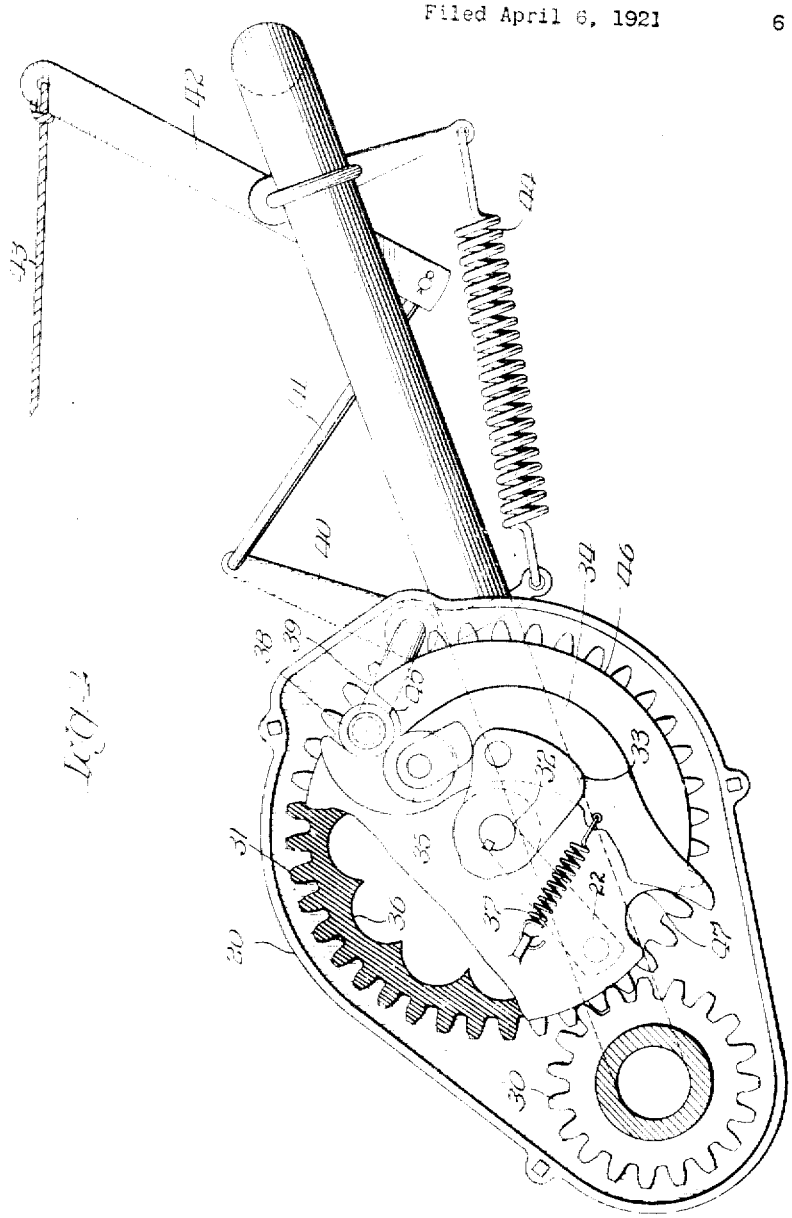

May 8, 1928. 1,669,037
J. E. BODA
POWER LIFT PLOW
Filed April 6, 1921 6 Sheets-Sheet 5
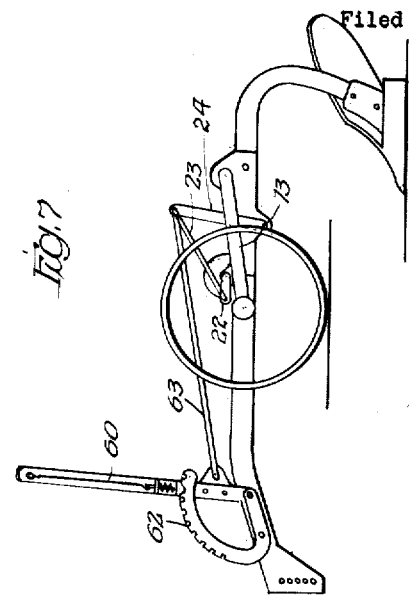
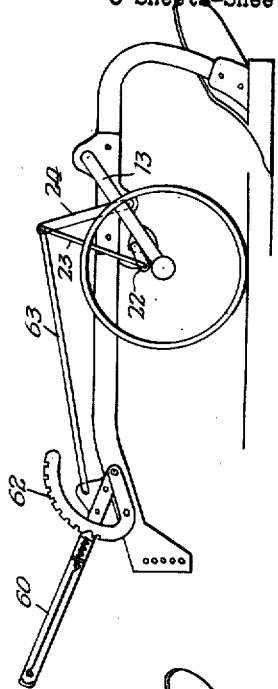
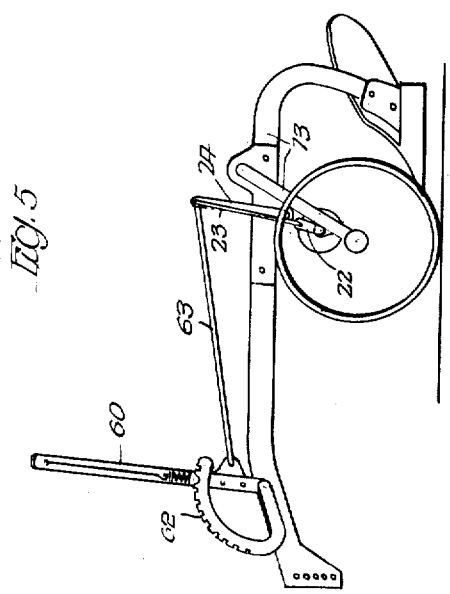
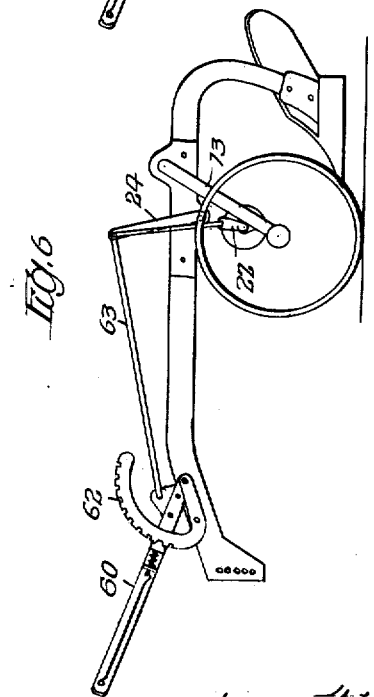
Inventor
Joseph E. Boda
By L. C. Shonts
Atty May 8, 1928.  
J. E. BODA  
POWER LIFT PLOW  
Filed April 6, 1921
1,669,037
6 Sheets-Sheet 6
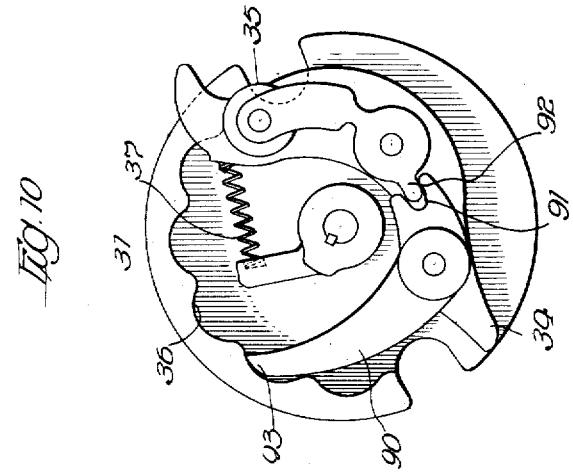
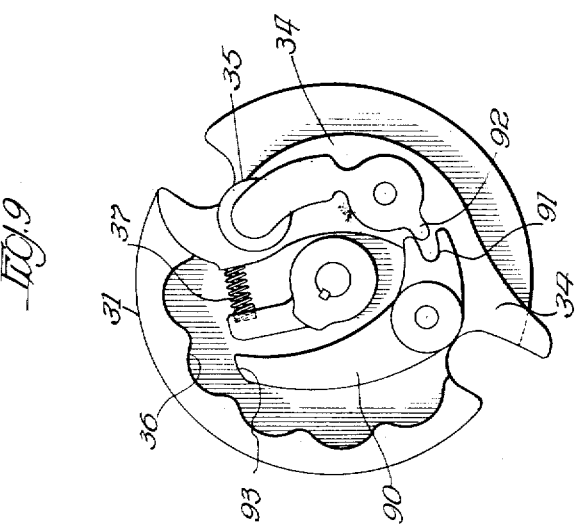
Inventor  
Joseph E. Boda  
By J. C. Shouts  
Atty.

Patented May 8, 1928.

1,669,037

UNITED STATES PATENT OFFICE.

JOSEPH E. BODA, OF MOLINE, ILLINOIS, ASSIGNOR, BY MESNE ASSIGNMENTS, TO MOLINE IMPLEMENT COMPANY, A CORPORATION OF ILLINOIS.

POWER-LIFT PLOW.

Application filed April 6, 1921. Serial No. 459,049.

The invention relates to powerlift plows.

It is particularly applicable to frameless or crank axle plows in which the power for lifting is derived from rotation of one of the supporting wheels, generally the land wheel.

The general object of the invention is to provide an improved, simplified, efficient powerlift for a plow of this character.

A more specific object is to provide an improved powerlift that will lift the plows to the same height above the ground regardless of the depth to which they may have been adjusted for plowing.

A further object is to provide an improved powerlift that will lower the plows by power as well as lift them.

Another object is to provide an improved, simplified plow that may be easily guided and backed without requiring adjustment of parts and without danger of damaging the mechanism.

Other objects and advantages of the invention will appear from the specification and drawings.

An embodiment of the invention is shown in the accompanying drawings in which

Figure 1 is a side view of the plow with plow bottoms lowered, the furrow wheel being in its position for opening up a furrow across unplowed land.

Figure 2 is a side view with the plow bottoms raised.

Figure 3 is a plan view.

Figure 4 is a side elevation and partial section of the lifting mechanism and associated parts.

Figures 5 and 6 are side views of portions of the plow illustrating the effect of the adjustment for depth when the plows are raised.

Figures 7 and 8 are side views of portions of the mechanism showing the effect of adjusting for depth when the plows are lowered.

Figures 9 and 10 are views of a modified form of clutch.

The plow has three plow beams 1, 2 and 3 carrying plow bottoms 4, 5 and 6. The beam 3 is attached to the beam 2 and beams 1 and 2 are connected together at their forward end by a cross member 7 and at their rear end by a brace 8. These beams form a rigid framework, which will hereinafter be referred to as a frame or framework to distinguish this rigid structure from the moving parts attached to it. A draft mechanism is attached to the forward ends of the beams 1 and 2.

It will be noted that beam 3 is attached to beam 2 without having any of the moving parts of the plow fastened to it, with the result that this third beam can be removed if desired, to convert the plow from a three-bottom to a two-bottom plow or vice versa.

Journaled on the plow beam is a furrow wheel crank axle 11 carrying a furrow wheel 12 and a land wheel crank axle 13 carrying a land wheel 14. The plows are raised and lowered by swinging these crank axles relative to the plow beams to thereby raise and lower the land and furrow wheels relative to the beams.

The lifting mechanism is operated by power from the landwheel. It operates directly on the landwheel crank axle, movement of such axle being transmitted under certain conditions to the furrow wheel axle, so that both are moved together for raising and lowering purposes.

The lifting mechanism includes a clutch contained within a housing 20 and arranged to operate a crank 22 to which is connected a link 23, that in turn, is pivoted to a link 24 pivoted to the frame. When the clutch is rotated to move the crank 22 clockwise from the position shown in Figure 1 to the position shown in Figure 2, the crank axle 13 will be swung counter-clockwise to lower the landwheel relative to the frame, thereby raising the plows. The housing 20 is supported at its lower end by being journaled on the crank axle and at its upper end by being bolted to the crank axle. Journaled on the crank axle 13 and fixed to the landwheel 14 is a gear 30 meshing with teeth on the face of an annular clutch member 31 that is journaled loosely on a shaft 32. The shaft 32 is journaled in the housing 20 which is provided with bearings for that purpose. The gear 30 and clutch member 31 are continuously rotated by the landwheel, the clutch member moving in a clockwise direction. Fixed to the shaft 32 is a member 33 having pivoted to it a dog 34 carrying a roller 35 adapted to engage the notches 36 on the interior of the clutch member 31. A spring 37 normally biases the dog 34 to cause roller 35 to engage one of the notches 36, but such engagement is prevented by a roller 38 carried by the end of a latch arm 39, which is operated by an arm 40, a link 41, a lever 42 and a cable or cord 43. The arm 40 is normally biased by spring 44 to the position shown in Figure 4, in which position the roller 38 engages in a notch 45 in the surface of a disk 46 keyed to the shaft 32.

With the clutch parts in the position shown in Figure 4, the dog 34 with its roller 35 is maintained out of engagement with the rotating clutch member 31, but, if the cord 43 is given a jerk, the latch roller 38 is pulled out of the notch 45 permitting spring 37 to move the dog 34 so that the roller 35 engages one of the notches 36. This locks the dog 34 to the continuously rotating clutch member 31 with the result that the shaft 32 is turned in a clockwise direction, carrying the disk 46 with it and thereby causing the notch 45 to pass beyond the position of roller 38. The roller then rides on the edge of the disk until another notch 47 in the surface of disk 46 comes opposite the latch roller 38, whereupon the roller enters the notch due to the biasing action of spring 44 and catches the dog 34 throwing it counter-clockwise and out of engagement with the rotating clutch member 31. The mechanism is thus automatically stopped after it is rotated a predetermined amount.

The inner end of the shaft 32 carries a short crank 22, which rotates with the shaft and is connected by links 23 and 24 to the framework as hereinbefore described.

If, when the parts are in the position shown in Figure 1, the cord 43 is actuated to engage the clutch, the crank 22 is rotated in a clockwise direction from the position shown in Figure 1 to that shown in Figure 2, the effect being to swing the crank axle 13 counter-clockwise. When the parts reach the position shown in Figure 2, the clutch is automatically tripped out as hereinbefore explained, the notch 47 being located so that the tripping out action takes place at about the time the link 23 and the crank 22 are in line or slightly thereafter, which leaves them in an over-dead-center position.

If, when the parts are in the position shown in Figure 2, the cord 43 is pulled to engage the clutch, the crank 22 will be rotated in a clockwise direction from the position shown in Figure 2 to that shown in Figure 1, the effect of which will be to swing the crank axle 13 in a clockwise direction. The amount of this movement is determined by an adjustment hereinafter described. Such movement is stopped as soon as the notch 45 in the disk clutch comes opposite the tripping latch roller 38.

The notches 45 and 47 are not diametrically opposite each other. The circumferential distance from the notch 47 to the notch 45 in one direction is more than 180 degrees with the result that, during the raising action, the clutch disk moves more than a half a revolution. During the lowering action, the clutch disk goes through less than a half a revolution. The over-dead-center position of the links locks the plows in raised position against a backward or return movement of the lifting mechanism and it places the parts in such a position that, when the clutch is tripped to lower the plows, the weight of the plow will act to cause a lowering movement. The position of the links is not depended upon to lock the plows lowered, such action being secured by the clutch.

In order to adjust the depth for plowing, an adjusting lever 60 is provided which is pivoted to the framework and carries a latch 61 cooperating with a toothed sector 62. This lever is connected by a link 63 with the link 24 pivoted to the framework and to the lifting link 23.

It will be observed, by referring to Figures 5 and 6, that, when the plows are in lifted position, the lever 60 may be swung from one of its extreme positions to the other without having any substantial effect on the position of the crank axle 13. This is due to the fact that when the link 24 is swung from the position shown in Figure 5 to that shown in Figure 6, the vertical movement of link 23 is negligible, because the centers about which these links swing are so nearly coincident and the upper end of link 23 is moving in a portion of the arc which causes scarcely any vertical movement.

When, however, the plows are lowered, an adjustment of the lever 60 affects the crank 13 very materially, the effect being illustrated in Figures 7 and 8. This is due to the fact that when the link 24 is swung from the position shown in Figure 7 to that shown in Figure 8 or vice versa, the link 23 and with it the crank axle 13, is moved through a very considerable distance, owing to the fact that the center about which link 23 must swing is removed from the center about which link 24 swings and the end of the link 23 is moving in a portion of the arc which causes its center to move proportionally great. The result is that link 24 swings about its center on the rigid frame, but link 23 is forced to move and carry with it the crank axle 13.

It will, accordingly, be clear that movement of the lever 60 has very little direct effect when the plows are raised, but has a very substantial effect in adjusting the depth of plowing when the plows are lowered and at work. It is possible to adjust for depth while the plows are raised and to secure the desired effect when the plows are lowered, because the final position of the parts when the plows are lowered, will be the same whether the lever 60 is adjusted while the plows are raised or while they are lowered.

This construction also insures that the plows will be lifted to substantially the same height above the ground regardless of the depth to which they may have been adjusted. The operating crank 22 is always moved through the same arc because its movement is dependent upon the notches in the clutch disk 46, and not upon the position of any of the other parts. When the mechanism operates to lift the plows from the position shown in Figure 7, the final position will be that shown in Figure 5 and when the mechanism operates to raise the plows from the position shown in Figure 8, the final position will be that shown in Figure 6, but the height of the plows in Figure 5 is substantially the same as their height in Figure 6. In other words, the plows are raised to substantially the same height above the ground no matter what their adjustment may have been for plowing purposes. In raising from the position shown in Figure 7, the plows are raised through a greater distance than when they are raised from the position shown in Figure 8, such increased raising action being due to the position of the link mechanism, which causes the throw of the crank 22 to effect a greater total raising action on the plows, but the final position of the plows is substantially the same in any case.

The feature of lifting the plows to the same height regardless of the depth to which they may have been adjusted for plowing is an important one, because it insures that the plows will be sufficiently high above the ground for transporting. The mechanism herein described secures this result in a very simple way and without the use of complicated parts.

The furrow wheel crank axle is adjusted by means of a lever 70 pivoted to the frame and having a latch 71 cooperating with a sector 72 illustrated in Figure 3. This lever has a pin and slot connection 73 with a link 74 pivoted to an arm 75 rigidly fixed to the furrow wheel crank axle. A link 76 is also pivoted to the arm 75, its other end sliding through an opening in an arm 77 attached to the landwheel crank axle. The link 76 is also provided with a stop 78 arranged to be engaged by the arm 77.

The furrow wheel crank axle is adjusted as shown in Figure 1 by moving the lever 70 from the full line to the dotted line position. This will pull the arm 75 from the full line to the dotted line position and rotate the furrow wheel crank axle in a counter-clockwise direction to raise the furrow side of the plows. Adjustment may be made in the opposite direction by moving the lever 70 from the dotted line toward the full line position, in which case, the weight of the parts will cause the furrow wheel crank axle to move in a clockwise direction carrying with it, the arm 75 and the link 74.

When the landwheel crank axle is swung in a counter-clockwise direction from the position shown in Figure 1 to raise the plows, the end of the arm 77 will slide along the link 76 for the first part of the movement and no motion will be transmitted to the furrow wheel crank axle, but as soon as the end of arm 77 strikes the stop 78, motion will be transmitted to arm 75 on the furrow wheel crank axle and that axle will be rotated in a counter-clockwise direction in unison with the landwheel crank axle, thereby raising both sides of the plows. This movement will have no effect on the adjustment of the furrow wheel crank axle because, as the arm 75 moves forward, it will carry with it, link 74 which will slide on the pin carried by lever 70. This does not disturb the lever 70 and when the plows are again lowered, the furrow wheel will assume the same position that it previously occupied when in lowered position.

This connection between the landwheel and the furrow wheel crank axle permits the power from the lifting mechanism to be first applied to the landwheel crank axle without adding the load of the furrow wheel axle. A rigid connection between these two axles would require more power for starting the lifting operation. Instead of depending on the lifting mechanism to start the furrow wheel, such wheel is lifted by running out of the previous furrow and after it has been started upward by such movement, the landwheel crank axle picks it up and moves the two together so that the total effect is to bring the plows out of the ground on an even keel. In other words, a level lift is secured. A lift of this kind would not be secured if the two axles were rigidly connected together, because in plowing, the furrow wheel must be lower than the landwheel and if both were raised to the same distance, the final position of the plows would be a tilted one. With the present construction, however, the parts are proportioned so that the plows come out of the ground substantially level and remain so while in transporting position.

The rear furrow wheel 80 is rigidly mounted on the plow beam framework on a support 81. The wheel is set at an angle as shown in Figure 3, so that it will bear against the furrow wall and absorb a very considerable portion of the side thrust. It has heretofore been considered necessary to swivel this wheel and to connect it with the crank axles to lift simultaneously with the lifting of the front end of the plow. It has been swiveled so that the plow can be turned, but it was found that if swiveled or castered, the plow could not be backed without twisting the wheel around or breaking or damaging some part of the mechanism. It was, therefore, necessary to provide mechanism for permitting the wheel to swivel under some conditions and for preventing it from swiveling under others. The constructions for accomplishing these results were necessarily complicated and expensive.

In the present invention, the wheel is rigidly fixed to the plow frame in the simplest possible manner and the plow can consequently be easily backed. The crank axles are located so that they are slightly forward of the center of gravity when the plows are lifted. They are, of course, still further forward of the center of gravity when the plows are lowered. The center of gravity or the weight of the parts will, accordingly, tend to raise the front end of the plows. This is a desirable method of lifting as it guides the plow out of the ground point first.

The draft mechanism includes two links 82 and 83 with a clevis or other suitable device for hitching to a tractor. The link 82 may be attached in any one of a number of holes 84 in a frame member 85 so as to vary the height of draft. The link 83 may also be fixed in any one of a number of holes 86 in a link 87 pivoted to the sector 62.

When the plows are in lowered position, the link 83 is loose, as shown in Figure 1, the entire draft being taken by the member 82, the height of which may be adjusted to suit the requirements.

When the raising movement starts from the position shown in Figure 1, the tendency will be for the front end of the plow frame to raise, but the front end will be prevented by the draft mechanism from lifting entirely, the member 82 acting as a compression member and the member 83 as a tension member. As the lifting operation continues, and because the front end of the plow cannot be raised, the rear end of the plow together with the rear furrow wheel is lifted until the parts finally assume the position shown in Figure 2, in which position, the draft mechanism including the members 82 and 83 forms a rigid, well-braced structure for holding the front end of the plow, while the plows themselves and the rear furrow wheel are off the ground. It will be readily understood that the tractor and the plow can easily be backed or turned in any position when the plows are thus raised because the tractor has connected behind it a two-wheel carriage supporting the plows instead of a three-wheel device.

The operation of the mechanism as a whole is as follows:

If the operator wishes to raise the plows, as for example, at the end of a furrow, he simply gives the cord 43 a pull and then releases it. The pull moves the lever 42 forward, unlatches the dog 34 and permits it to lock the shaft 32 connected to the link mechanism to the continuously rotating clutch member 31. This swings the landwheel crank axle counter-clockwise and after it has moved a certain distance, it picks up the furrow wheel crank axle and moves them both together. The combined action of the two, together with the running of the furrow wheel out of the furrow, causes the plows to be kept level while lifted and after they are raised.

The lifting action is automatically stopped when the crank 22 and the link 23 have moved slightly past a dead center position, such movement being arrested by reason of the fact that the roller 38 enters the notch 47 and disengages the dog 34 from the rotating clutch member 31.

When the operator desires to lower the plows, he again jerks on the cord 43, which again unlatches the dog 34 and permits it to engage the rotating clutch member 31. The crank 22 continues to move in a clockwise direction, but the effect of the linkage is such that the crank axle is moved in a clockwise direction, thereby lowering the landwheel relative to the plow frames and lowering the plows into the ground. This action continues until automatically stopped by the latch 38 entering the notch 45 and disengaging the dog 34 from the rotating clutch member 31.

If the operator desires to adjust the depth of plowing, he can do so while the plows are lowered, in which case, the depth will be immediately changed, or he can do so while the plows are raised, in which case, the final lowered position will be determined. This adjustment for depth does not change the final raised position of the plows, such position being substantially the same for all depth adjustments.

If the operator desires to adjust the furrow wheel, for different depths of furrows, he can easily do so by simply moving the lever 70. This adjustment does not affect the lifting action in any way and the lifting or lowering of the plows does not change the adjustment.

A modification of the clutch construction is illustrated in Figures 9 and 10. The general construction of the clutch is the same, the dog 34 carrying a roller 35 that cooperates with notches 36 in the disk 31. The spring 37 is located a little differently but acts on the dog in the same manner as in the clutch heretofore described. There is provided in this clutch, an additional dog 90 having a slotted end 91 with which meshes a projection or tooth 92 carried by the dog 34. When the parts are in the position shown in Figure 9, the two dogs occupy the position there illustrated with both out of engagement with the notches 36 in disk 31. When, however, the clutch is tripped so that the dog 34 moves to cause the roller 35 to engage one of the notches 36, the dog 90 is moved in a counter-clockwise direction by the tooth 92 causing the end 93 of dog 90 to engage in one of the notches 36, thereby preventing any backward movement of the clutch.

This clutch may be converted into one of the first described type by simply removing the dog 90 or by providing a means for rendering the dog 90 inactive.

The advantage of this construction is that it positively prevents any backward movement of the clutch, particularly when the plows are lowered. During the lowering operation, the weight of the plows tends to move them downward more rapidly than the clutch would normally be turned by rotation of the landwheel. The effect on the clutch is the same as if the landwheel were turned backward. With the above construction, this backward movement of the clutch is prevented and, consequently, the plows cannot lower any more rapidly than the clutch is rotated by movement of the landwheel. This prevents the plows from dropping suddenly to the ground. It also prevents the plows from falling down if the lifting mechanism is tripped while the plow is stationary.

One of the important features of this invention is that an efficient lifting mechanism is provided that is made of a minimum number of parts. The clutch parts are contained within a small housing located near the landwheel axle and are of such a size as to be scarcely noticeable. The connections between the clutch and plow frame consist of a few simple links. The controlling mechanism is made of a few simple parts and the adjusting levers are likewise made of a minimum number of plain rods and levers. To devise a plow lifting mechanism having a few simple parts which can be easily produced and which, when assembled on the plow make a clean, neat-appearing job, has been one of the goals toward which much effort has been directed. Such a construction, not only cheapens the cost of production, but it enables a clean-cut appearing and efficient-acting implement to be produced. In the present construction, the best results have been secured with a minimum number of parts.

Another advantage is that when the plows are lowered, the action of the lifting mechanism is positive, that is, it operates to positively swing the landwheel crank axle in a clockwise direction. It thereby throws the weight of this axle, its wheel and the associated parts on the land side of the plow, which causes that side of the plow to tip downwardly, thereby directing the points of the plows into the ground and applying the weight of the parts to cause the plows to enter the ground.

Another feature is that the landwheel, the landwheel crank axle and associated parts are locked to the plow beams when they are in plowing position. This serves to make the action of the plows more even and steady, because the weight of the parts counteracts any tendency that the plows may have to ride out of the ground. This result is accomplished without the addition of any locks or latches, it being inherent in the lifting mechanism.

Still another important feature is that the plow may be readily converted from a two-bottom to a three-bottom plow or vice versa. The third beam is attached in such a way that it can be easily removed. The lifting mechanism and crank axle are connected so as to be totally independent of this third beam. In larger plows, the same arrangement is used to convert a three-bottom into a four-bottom or vice versa. In such case, the three beams will form the framework now formed by two beams and the fourth beam will be attached to the third beam.

Another feature is that all the gears and clutch parts are enclosed in a compact housing, which keeps out dirt and foreign substances, as well as serving as a means for containing lubricant. The only moving parts outside of the housing are links and rods which are not seriously interfered with by reason of the dust and dirt incident to the use of the plows. The importance of having a compact, enclosed mechanism of this kind will be readily appreciated when comparison is made with various complicated structures that have been devised for accomplishing the lifting of plows, in the most of which, the design prevents the enclosure of the parts.

It is to be understood that the structure shown is for purposes of illustration only and that variations may be made therein without departing from the spirit and scope of the invention as defined by the claims.

What is claimed is:

1. A frameless, powerlift, tractor plow having plow beams connected together to form a beam structure, ground wheels journaled on crank axles pivoted to the beam structure, a ground-wheel-operated powerlift clutch which, when operated, moves through a definite cycle of movement and is automatically stopped, connections between the clutch, the beam structure and the crank axles to cause said clutch to swing the crank axles to positively raise the beam structure during one of the cycles of movement of said clutch and to positively lower it during the next cycle, and means for adjusting the connections to vary the position of the crank axles to vary the working position of the beam structure, said connections including links whose pivotal connection together and with the adjusting means at one end is in substantial alignment with the pivotal connections of the other ends of the links when the plow is raised so that when the clutch is operated to raise the plow, the beam structure will be raised to substantially the same height above the ground from all working positions.

2. A frameless, powerlift tractor plow having plow beams carrying plow bodies, said beams being connected together to form a beam structure, a land wheel crank axle pivoted to the beam structure and carrying a land wheel, a furrow wheel crank axle pivoted to the beam structure and carrying a furrow wheel, a powerlift clutch carried by the land wheel crank axle and operated by power from the land wheel, said powerlift clutch having a member which is intermittently rotated through definite cycles in the same direction, a link connected to said member, a second link pivoted to the first and to the beam structure, an adjusting lever pivoted to the forward end of the beam structure, a link connecting said lever and the first two links, said first two links being located so that, when the plow is raised, movement of them by means of the adjusting lever will have no substantial effect in moving the crank axle, connections between the land wheel crank axle and the furrow wheel crank axle to raise the latter when the first is raised so that the plow will be raised to a substantially level position, and a draft device connected to the forward end of the beam structure.

3. A powerlift plow having plow beams rigidly connected together to form a beam structure, supporting wheels, pivotal lifting mechanism between the supporting wheels and beam structure including a clutch device for rotating a crank, a link pivoted to the crank, a second link pivoted to the first and to the beam structure, and means for adjusting the second link, said links being proportioned and pivoted so that, when the plows are raised, adjustment of the second link has no substantial effect in moving the first link longitudinally, but when the plows are lowered, adjustment of the second link has a marked effect in moving the first link longitudinally.

4. A powerlift plow having plow beams connected together to form a beam structure, supporting wheels, pivotal lifting mechanism between the supporting wheels and beam structure including a clutch device for intermittently rotating a crank, a link pivoted to the crank, a second link pivoted to the first link and to the beam structure, the pivot of the link to the beam structure being located so that, when the plow is in raised position, said pivot will be roughly coincident with the pivot of the first link to the crank, and means for adjusting the second link.

5. A frameless, powerlift moldboard plow having plow beams carrying plow bodies, crank axles and ground wheels for supporting the plow, said beams extending forward beyond the crank axles and being connected together to form a beam structure, a powerlift mechanism for swinging one of the crank axles to raise and lower the plow, said mechanism including a clutch for intermittently rotating a crank, a link pivoted to the crank, a second link pivoted to the first and to the beam structure, a lever pivoted at the forward end of the beam structure and a link connecting the lever with the first two links at the point where the latter are pivoted together, said first two links being proportioned and located so that, when the plow is raised, movements of the adjusting lever will move the links without substantially changing the position of the crank axle but, when the plow is lowered, movements of the adjusting lever will move the crank axle.

6. In a powerlift plow, in combination, a beam structure having a plowing device carried thereby, means operated by the travel of the plow for raising and lowering it, said means moving in opposite directions on opposite sides, connecting means for effecting operative connection between each of said sides and said beam structure to raise and lower said structure, and mechanism for adjusting the connecting means to vary the depth to which the beam structure may be lowered, said connecting means having links which are connected together so that, when adjusted with the plows in raised position, the position of the crank axle is substantially unchanged, but when adjusted with the plow in lowered position, the position of the crank axles is substantially changed to vary the depth of plowing.

7. The combination in an agricultural implement having a beam structure of a crank axle pivoted thereto, a ground wheel journaled on the crank axle, a powerlift clutch carried by the crank axle adjacent the ground wheel and driven thereby, said clutch including a crank, which, when the clutch is operated, is rotated through a cycle of movement and automatically stopped, a link pivoted to the crank, a second link pivoted to the first and to the beam structure, and means for adjusting the pivot of the links and holding it in adjusted position, said links being coordinated so that adjustment of their pivot, when the implement is raised, has substantially no effect in moving the crank axle but adjustment when the implement is lowered moves the crank axle to vary the working depth of the implement.

In testimony whereof, I affix my signature.

JOSEPH BODA.

CERTIFICATE OF CORRECTION.

Patent No. 1,669,037.  Granted May 8, 1928, to

JOSEPH E. BODA.

It is hereby certified that error appears in the printed specification of the above numbered patent requiring correction as follows: Page 6, claim 6, line 114, beginning with the words "having links" strike out all to and including the word "plowing" line 121, and insert instead "including links whose pivotal connection with each other and with the adjusting means is in substantial alignment with the pivotal connections of the other ends of the links when the plow is raised"; and that the said Letters Patent should be read with this correction therein that the same may conform to the record of the case in the Patent Office.

Signed and sealed this 5th day of June, A. D. 1928.

M. J. Moore,
Acting Commissioner of Patents.

(Seal)

link pivoted to the crank, a second link pivoted to the first and to the beam structure, and means for adjusting the pivot of the links and holding it in adjusted position, said links being coordinated so that adjustment of their pivot, when the implement is raised, has substantially no effect in moving the crank axle but adjustment when the implement is lowered moves the crank axle to vary the working depth of the implement.

In testimony whereof, I affix my signature.

JOSEPH BODA.

CERTIFICATE OF CORRECTION.

Patent No. 1,669,037.                             Granted May 8, 1928, to

JOSEPH E. BODA.

It is hereby certified that error appears in the printed specification of the above numbered patent requiring correction as follows: Page 6, claim 6, line 114, beginning with the words "having links" strike out all to and including the word "plowing" line 121, and insert instead "including links whose pivotal connection with each other and with the adjusting means is in substantial alignment with the pivotal connections of the other ends of the links when the plow is raised"; and that the said Letters Patent should be read with this correction therein that the same may conform to the record of the case in the Patent Office.

Signed and sealed this 5th day of June, A. D. 1928.

M. J. Moore,
Acting Commissioner of Patents.

(Seal)